Dec. 26, 1950     J. P. GLASS, JR     2,535,914
INDUCTION DEVICE HAVING A SUBSTANTIALLY PURE SINE
RELATION BETWEEN THE COUPLING AND THE
RELATIVE DISPLACEMENT OF ITS ELEMENTS
Original Filed Aug. 21, 1944     7 Sheets-Sheet 1
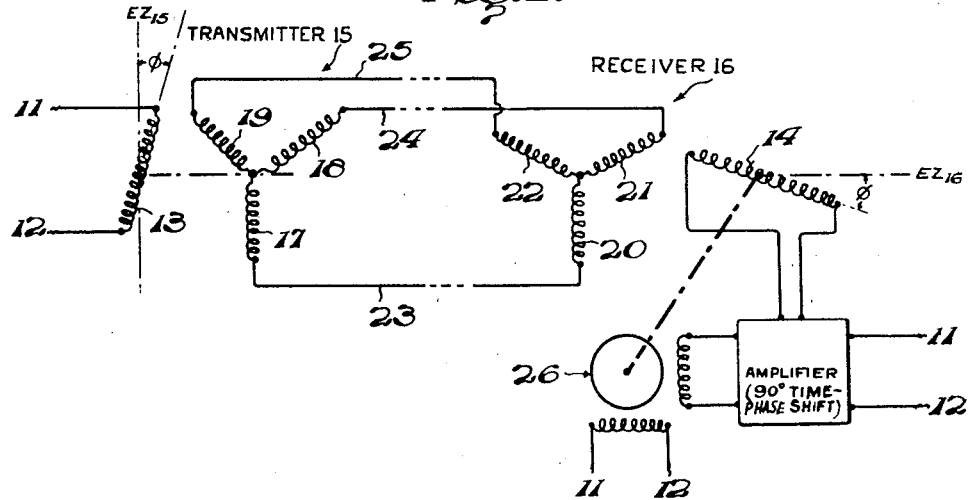
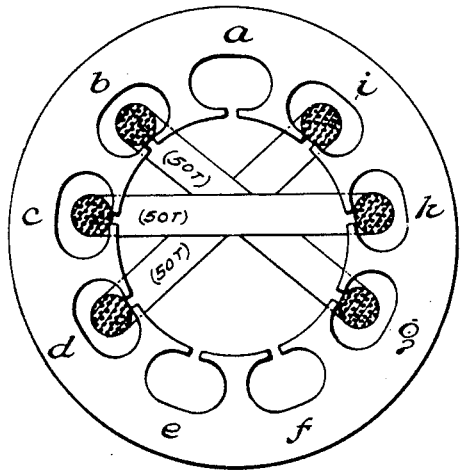
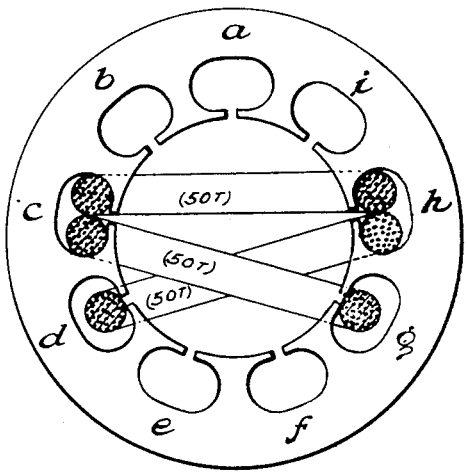
Inventor
John P. Glass, Jr.
By Leonard L. Kalish
Attorney

DOES NOT RELY ON Y CONNECTION

USES Y CONNECTION

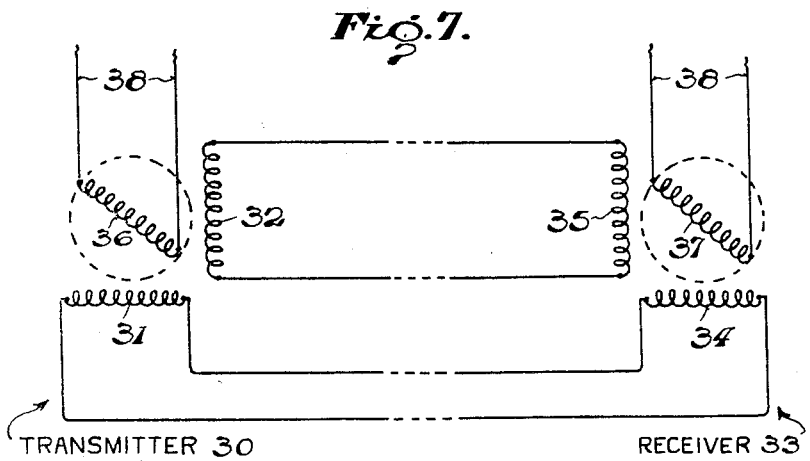
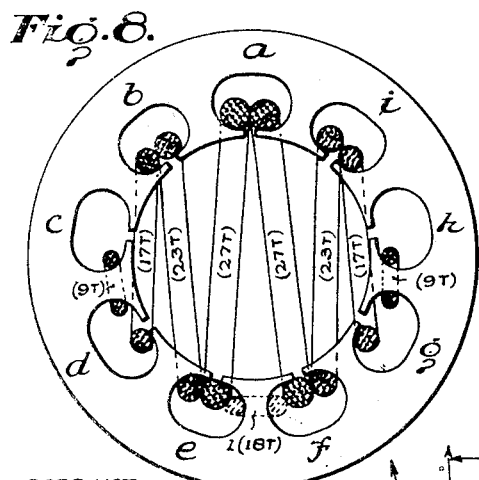
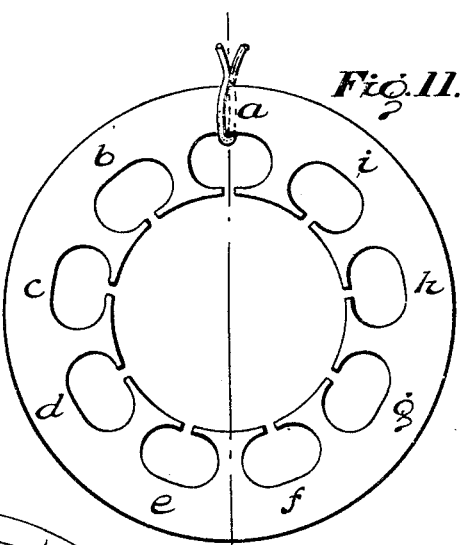
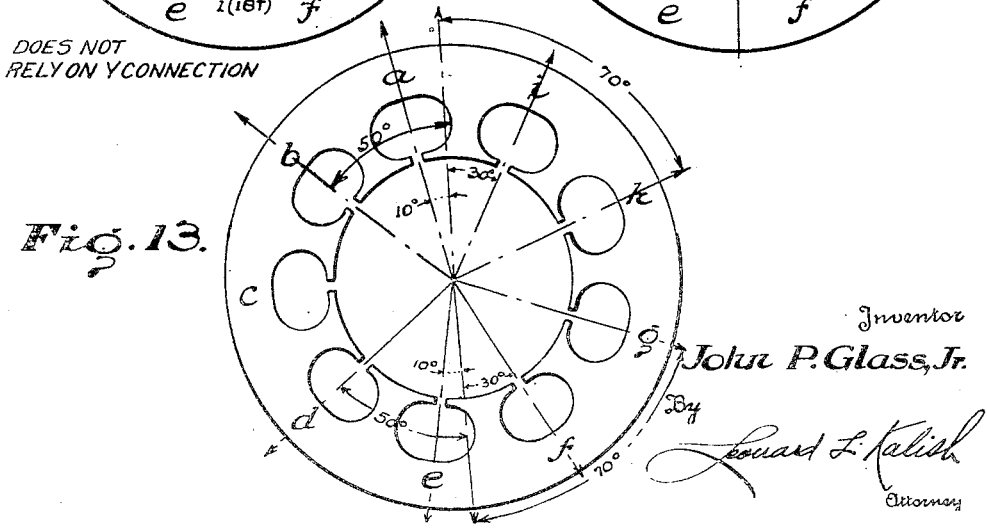

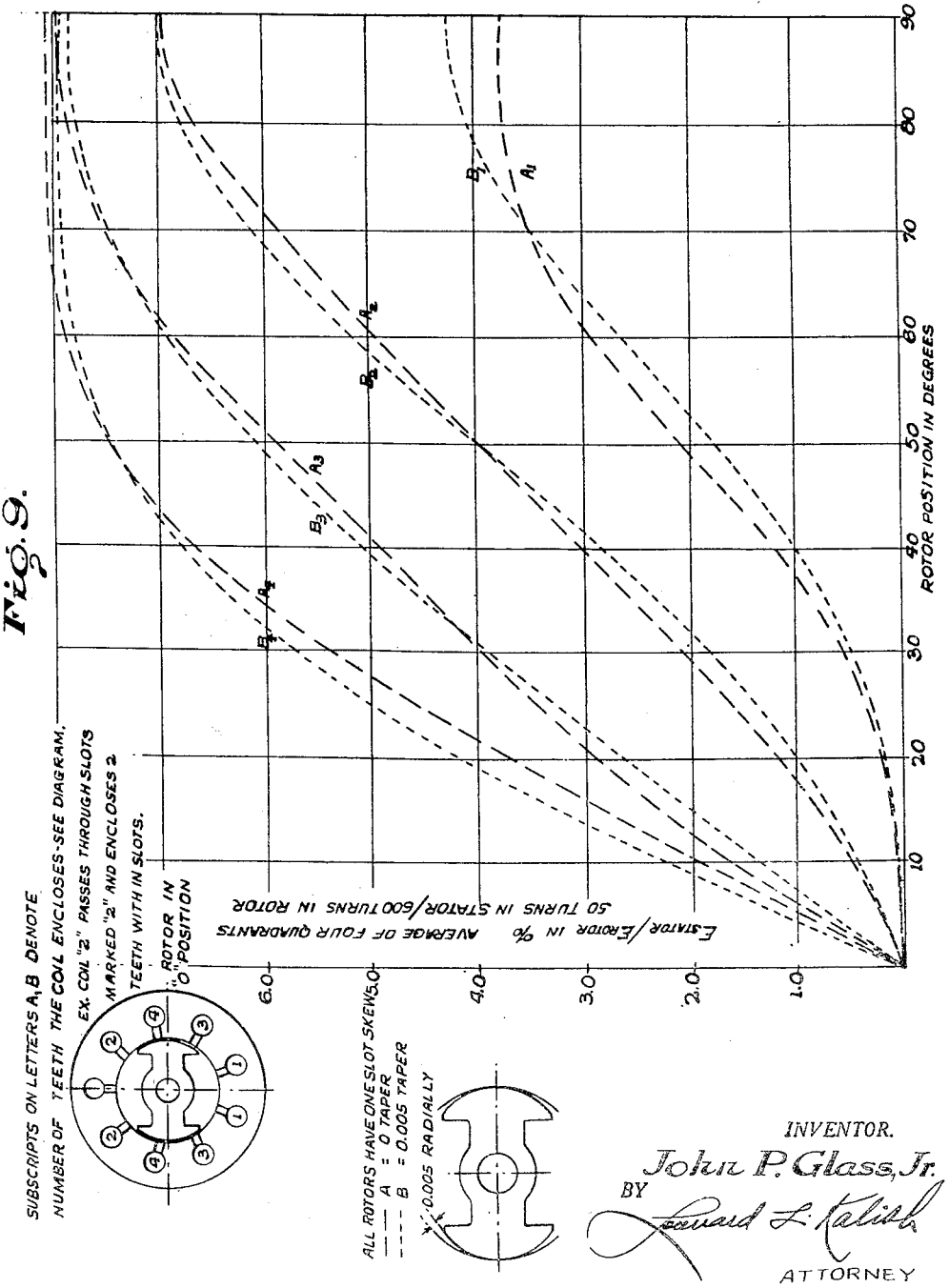

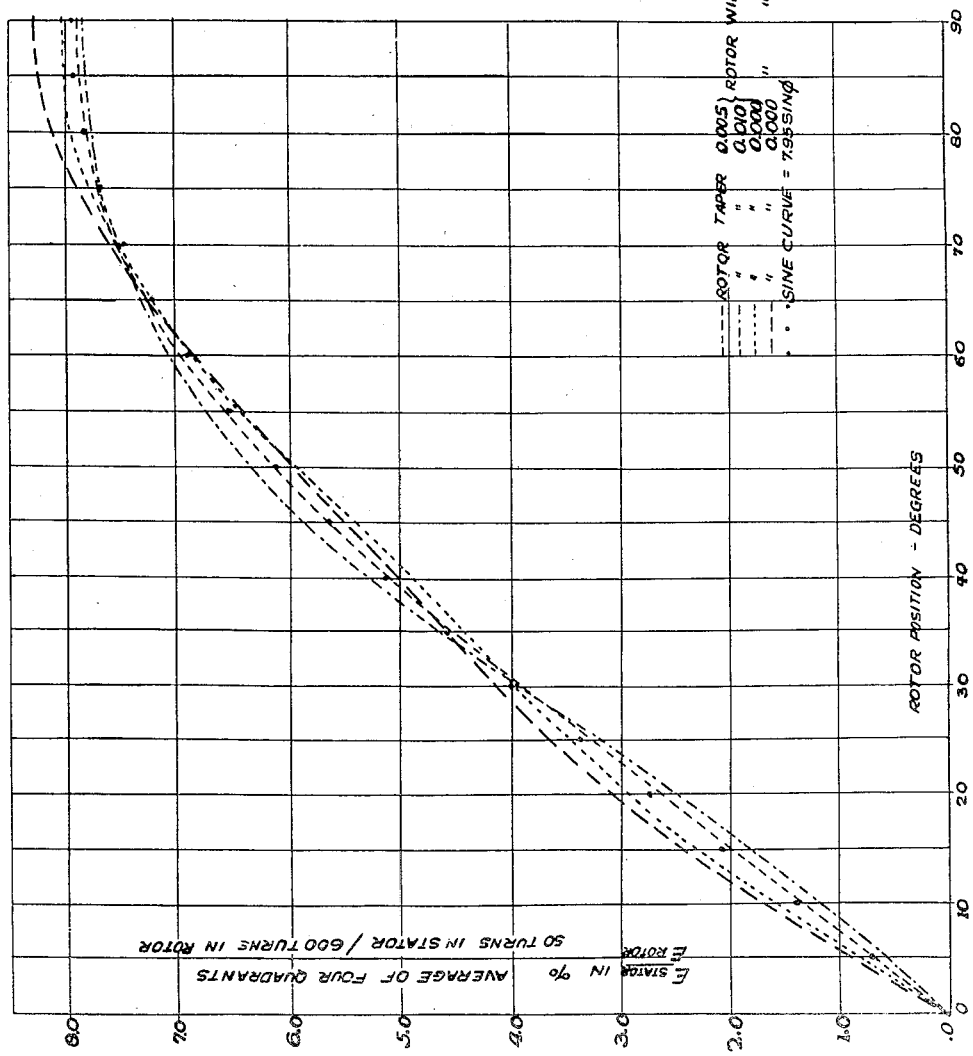

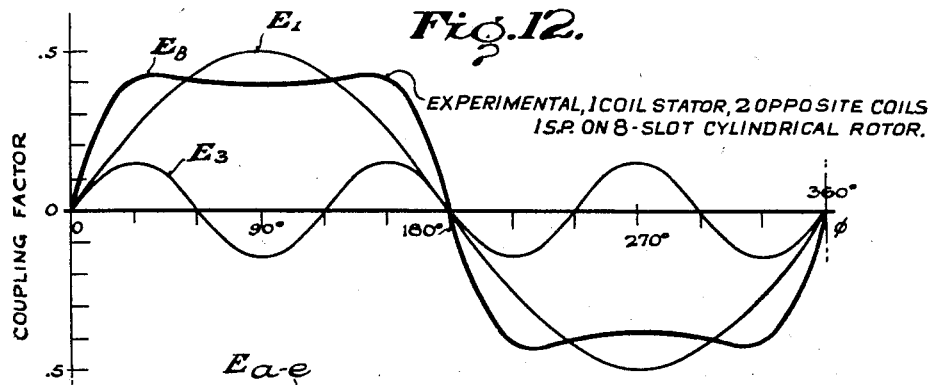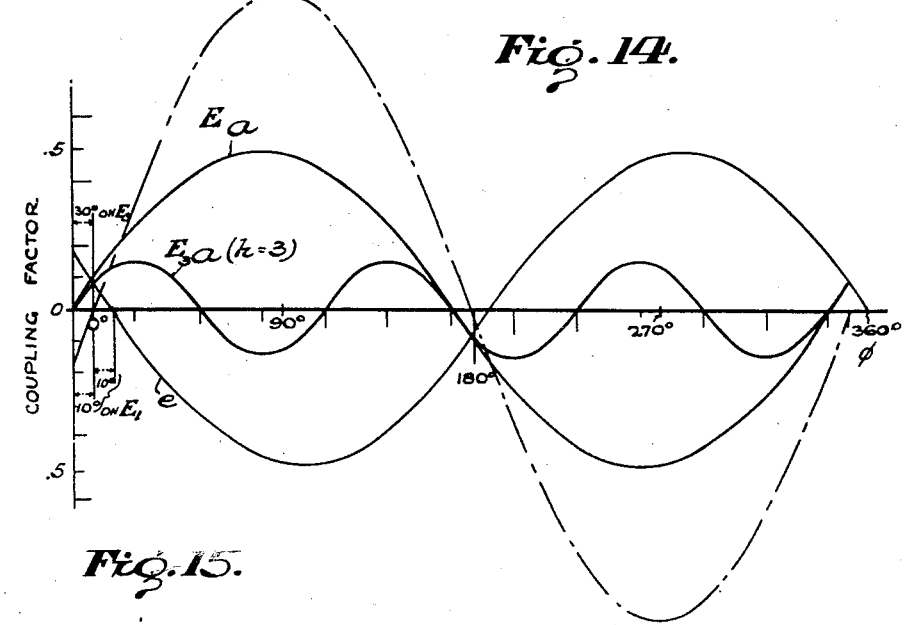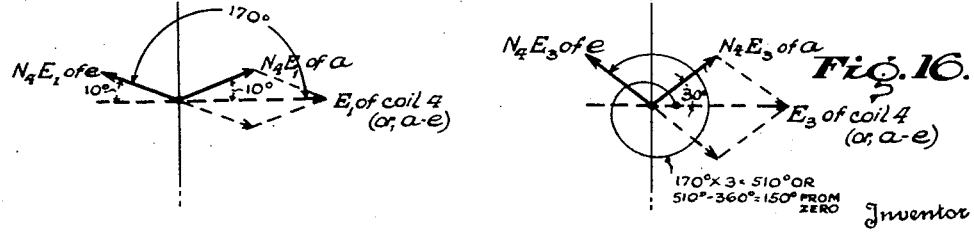

Dec. 26, 1950     J. P. GLASS, JR     2,535,914
INDUCTION DEVICE HAVING A SUBSTANTIALLY PURE SINE
RELATION BETWEEN THE COUPLING AND THE
RELATIVE DISPLACEMENT OF ITS ELEMENTS
Original Filed Aug. 21, 1944     7 Sheets-Sheet 7
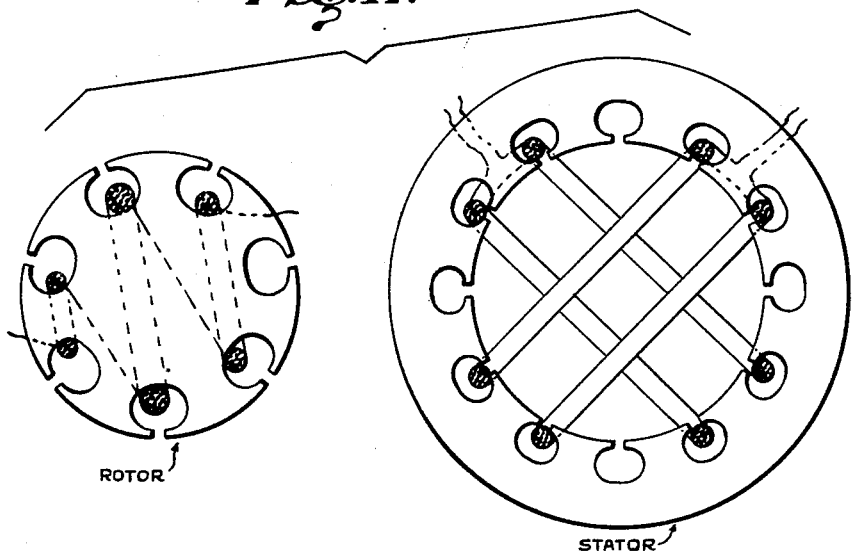
Fig. 17.
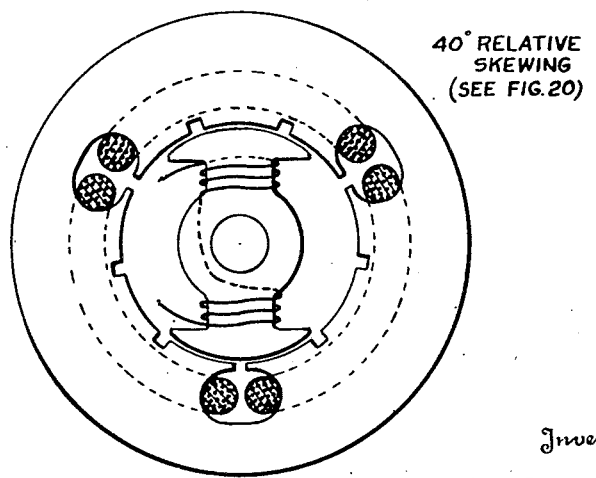
Fig. 18.
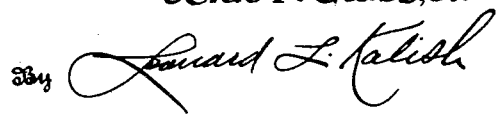
Inventor
John P. Glass, Jr.

Patented Dec. 26, 1950

2,535,914

UNITED STATES PATENT OFFICE 2,535,914

INDUCTION DEVICE HAVING A SUBSTANTIALLY PURE SINE RELATION BETWEEN THE COUPLING AND THE RELATIVE DISPLACEMENT OF ITS ELEMENTS

John P. Glass, Jr., Haverford Township, Delaware County, Pa., assignor to Bendix Aviation Corporation, Teterboro, N. J., a corporation of Delaware Original application August 21, 1944, Serial No. 550,461. Divided and this application January 5, 1949, Serial No. 69,258

13 Claims. (Cl. 318—24)

This invention relates to the improvement of performance of electrical devices having relatively movable parts whether the latter are rotated or translated linearly from one position to another. It particularly relates to accurate telemetric servo-operation by simultaneous movements of rotors in transmitting and receiving devices, and especially when they are of the well known "synchro" or self-synchronous motor type having 3-phase stators.

This application is a division of my copending application Serial Number 550,461, filed August 21, 1944, now Patent 2,488,771, issued November 22, 1949.

A general object of the invention is to provide, with such devices, novel methods of and means for the production of substantially pure sinusoidal voltage and impedance variations with rotor angular position.

One specific object is to provide a highly accurate telemeter by the substantial elimination of errors due to rotor characteristics. Another is the improvement of accuracy by novel methods of and means for minimizing inaccuracies in telemetering due to the stators, said methods and means relating to the novel distribution of the stator windings.

Another general object is to provide electrical engineers with a new tool for use in predetermining the design of electrical devices having rotors to give optimum performance, which is important in either large or high-speed generators and motors, in pure sine generators, and in telemeters of the self-synchronous type. I have found that the performance of both generators and motors is improved by the reduction to a minimum of the harmonic components which are generally attenuated and lost in transmission with a corresponding loss in efficiency.

The above and other objects and novel features of the invention will more fully appear from the following detailed description when the same is read in connection with the accompanying drawings. It is to be expressly understood, however, that the drawings are for the purposes of illustration only and are not intended as a definition of the limits of the invention.

Heretofore it has been the practice to seek accuracy of telemetering by making self-synchronous transmitters and receivers alike and relying upon the matching of their characteristics. But this practice has not proved adequate since practical manufacturing tolerances are too large for high accuracy unless special provisions are made. I have discovered that there are great advantages in telemetering obtained by minimizing departures from a pure sinusoidal output according to the present invention.

It is known that any graph of either voltage or impedance against either angular position or time may be analyzed on the basis of a Fourier series with any desired degree of closeness by the use of a sufficient number of terms. In accordance with the present invention, there is provided a distribution of windings in the stator and/or rotor to substantially eliminate all harmonics which could effect the performance. Further the invention includes a new technique in the use of the Fourier analysis to make possible for the first time the straight-forward design of such stators, e. g., instead of requiring the testing of a succession of experimental models. This approach of eliminating the harmonics by not forming them is more efficient than any scheme, such as in, e. g., the United States Patent 2,348,572 issued to P. H. Richardson, in which the harmonics are first formed and subsequently attenuated and wasted. And the techniques are radically different.

Before going into details, a general brief preview is had of the instant approach. For example, by the use of a symmetrical 2-pole rotor, a stator coil voltage $E_s$ and its angle $\phi$ may be represented by $$E_s = E_1 \sin \phi + E_3 \sin 3\phi + E_5 \sin 5\phi + E_7 \sin 7\phi + \ldots \quad (1)$$

both the cosine terms and all even sine terms having been eliminated by the rotor symmetry. By using a 3-phase stator, Y-connected, the 3rd and 9th harmonics cancel out as is well known. The 9th harmonic also cancels out with 9-slot stators thus leaving the 5th and higher harmonics with their amplitude diminishing rapidly with the number of harmonics. This leaves the 5th and 7th harmonics as the main sources of error. With a salient-pole rotor the 5th and 7th harmonics may be substantially eliminated by tapering the pole faces consistent with their width.

But when a shaped pole rotor is used in a receiver and for any reason its driving servo fails, said rotor introduces errors into the system which destroy the accuracy in other parallel receivers. This makes a cylindrical non-salient pole rotor highly desirable. Since stators having 2-pole rotors used only odd numbers of slots to minimize errors and, for non-split windings and 3-phase stators, the number of slots would be odd integer-multiples of 3 and the possible number of slots in the stator would be 3, 9, 15, 21, 27, 33, . . . .

Taking, for example, a 9-slot stator and an 8-slot circular non-salient 2-pole rotor with approximately one-slot relative skewing of stator and rotor, the number of bars in each slot may be adjusted according to the present invention to give substantially complete elimination of the 5th and 7th harmonics, parallel coils, or equivalents, with unequal numbers of turns being thus used in the stator under the instant invention.

After reaching this concept, then from inspection of graphs of $E_s/E_r$ for different rotor angles, where $E_s$ and $E_r$ are respectively the voltages across the stator (i. e. across the phase under consideration) and across the rotor, I changed the coil winding distribution from 100–50 for one phase to 80–50–20 (or about 53⅓, 33⅓, 13⅓% of the total turns per phase) with a marked improvement in the performance.

However, by my modification of the Fourier analysis, the percentages become 53.2, 34.7, 12.1 and the elimination of the 3rd through the 9th harmonics is substantially complete and independent of the characteristics for any symmetrical rotor, a matter of practical importance. This produces in a 3-phase self-synchronous servo-telemetric system both a much higher accuracy and a much lower residual null-voltage which permits the use of a much more sensitive servo-drive for the receiver. Further, by the Fourier analysis modified according to the present invention, with a 9-slot stator, a 2-pole symmetrical rotor, and a Y-connection not desired, four coils may be used with 34.7, 30.5, 22.7 and 12.1% of the total turns per phase with (due to symmetry about the 9th harmonic) negligible harmonics from the 3rd through the 15th, and no higher harmonics produced in appreciable amounts.

And, for special purposes, the requirements may similarly be met by the thus-modified Fourier analysis. For example, a virtually equal winding at right angles to the aforementioned parallel coils to provide two components at right angles, may be by a winding made of a ladder of split-coils halving the 34.7, 30.5, 22.7, 12.1% values noted earlier herein.

The foregoing résumé illustrates both the power and flexibility of the method of the present invention.

In the drawings, wherein like characters of reference indicate like parts throughout:

Figure 1 is a diagram of a conventional self-synchronous servo-telemetric system;

Figure 2 is a diagram showing a typical stator with a conventional coil distribution, the coils having an equal number of turns and being progressively spaced by equal angles;

Figure 3 is a similar diagram showing a common distribution of like coils suitable for 3-phase systems;

Figure 7 is a wiring diagram for a 2-phase telemeter in which the 2 phases are normal to each other for the stator and a single phase winding is used for the rotors;

Figure 8 is a coil-distribution for a 9-slot stator with a ladder-type coil shown normal to that of Figure 5, the lower coil of Figure 5 being shown in dotted lines in the bottom of Figure 8 to show the relative orientation of the coils for the two phases;

Figure 9 is a graph showing the relation between rotor angle and the coupling factor for a 9-slot stator and a salient 2-pole rotor with both zero and 0.005 inch taper as shown in one pilot diagram while the other shows the angular reference zero;

Figure 10 is a similar graph for the 3-slot pitch coil for several rotor widths and tapers;

Figure 11 is a diagram of a 9-slot stator showing a bar and the reference axis of the rotor;

Figure 12 is a graph showing the coupling factor for a phase and the fundamental and third harmonic plotted against time;

Figure 13 is a diagram for a 9-slot stator showing the position of the reference axis for symmetry;

Figure 14 is a graph having the same coordinates as Figure 12 but showing the fundamental for the 4 slot pitch coil a—e with the fundamental shifted 10° and the third harmonic at 30° from the reference axis for Figure 13;

Figure 15 is a vector diagram for the fundamental of the graph of Figure 14;

Figure 16 is a similar vector diagram for the third harmonic of Figure 14;

Figure 4:
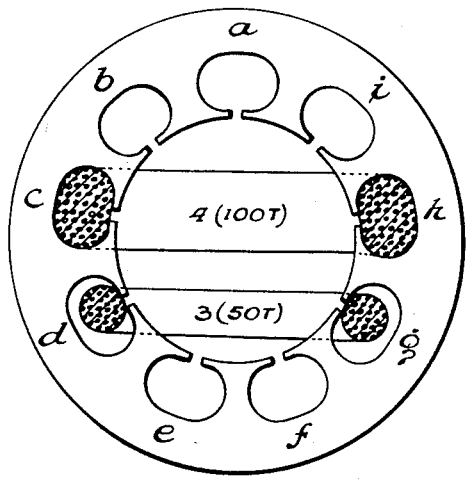
Figure 4 is a similar diagram of another more or less conventional winding giving results identical with those of Figure 3.

Figure 17 is a wiring diagram for a 7-slot single-phase rotor working in a 12-slot normal 2-phase stator with the rotor winding according to the invention; and Figure 18 is a similar diagram of a salient 2-pole tapered rotor in a 3-coil 3-slot stator with 6-dummy-slots to effectively constitute a 9-slot stator.

Consider a well known self-synchronous servo telemeter with similar, except for the servo, transmitter and receiver units as diagrammatically shown in Figure 1. A. C. supply lines 11 and 12 are connected with rotor coil 13 of the transmitter and receiver units 15 and 16. Units 15 and 16 respectively have 3 phases, 17, 18, 19 and 20, 21, 22 Y-connected by lines 23, 24, 25. The equilibrium position is shown, the receiver coil 14 being at right angles with the transmitter coil 13 and the flux in the receiver to minimize the voltage output of coil 14. The zero reference position at the transmitter is $EZ_{15}$ taken with coil 13 parallel with depending phase 17, and that, $EZ_{16}$, for the receiver is normal to the plane of depending phase 20. In spite of the fact that rotor coils 13 and 14 do not have like positions even at this zero reference condition, I have discovered that pure sinusoidal outputs produce precisely equal angular movements of rotor coils 13 and 14 for equilibrium.

The two phase motor 26 is operated in accordance with the phase difference of the amplified output of receiver rotor 14 from the A. C. supply to produce the stated equilibrium condition, a 90° phase difference being provided, e. g., in the amplifier.

Then, allowing for the 90° difference, the zero references $EZ_{15}$ and $EZ_{16}$ can both be brought into parallelism with the depending phases 17 and 20 respectively of the transmitter and the receiver for the purpose of determining telemetric error.

Instead of having a single coil for each phase, actually a 9-slot stator may be used with a plurality of coils per phase. These could be conventionally wound as in Figure 2 as far as one phase is concerned. With a two-pole symmetrical rotor parallel to coil c—h, which coils b—g and d—i supplement, all the cosine terms and even harmonic sine terms drop out. For the instant example, each of the three coils has 50 turns.

But for a 3-phase 9-slot stator, the coils are conventionally modified as in Figure 3 to have like coils for each phase by having each phase occupy one-third of the total number of slots, 3 in this case. Thus we have coils c—h, c—g, and d—h, each having 50 turns as in Figure 2.

As a matter of reducing the labor of winding and tying, but with no significant or perceptible change of the electro-magnetic effect, these coils may be more or less conventionally rearranged, as shown in Figure 4, without changing the electrical characteristics of the winding and hence without coming within the present invention. The ends of the bars which form the parallel coils may be reconnected to form equivalent coils in which the direction-sense of the several bars is not altered, many alternative coil patterns being possible without affecting the electrical characteristics. The parallel coils are described both for the sake of clarity and as the preferred embodiment.

Coil c—h encloses 4 teeth in the shorter path and has 100 turns. Coil d—g similarly encloses 3 teeth and has 50 turns. This arrangement has objectionably large 5th and 7th harmonics present when a circular rotor is used, said harmonics respectively appearing in Equation 1 as $$E_5 \sin 5\phi \text{ and } E_7 \sin 7\phi$$

As has earlier been noted, the 5th harmonic may be substantially eliminated and the 7th materially reduced by the use of a slight taper on the ends of the two salient poles. This feature will be considered further later herein and is considered to be one part of the invention. Alternatively one harmonic, e. g., the 5th, may be eliminated in the winding of Fig. 2 by using the $5 \times 40° = 200°$ electrical angle between the coils with $0.5N/\cos 20° = 0.532N$ turns for each of the side coils b—g and d—i for N turns of coil c—h.

But another, and commercially better, solution exists in another part of the invention. It was realized that, with a 9-slot stator, a maximum of four parallel coils can be used in each phase. The main point here is that a maximum of only four independent coils per phase is possible in a 9-slot stator. As will be shown later for substantially complete elimination of the odd harmonics from the 3rd through the 15th, the 3rd harmonic being eliminated without the use of a 3-phase stator, N turns per phase in the coils, identified by the subscript using number of teeth in the shorter path, is as follows expressed both in percent of the total number per phase and in the actual number of turns per phase:

| Coil, s. p. | Percent | Turns |
|---|---|---|
| $N_4$ | 34.73 | 52 |
| $N_3$ | 30.54 | 46 |
| $N_2$ | 22.67 | 34 |
| $N_1$ | 12.06 | 18 |
|  | 100.00 | 150 |

Figure 5:
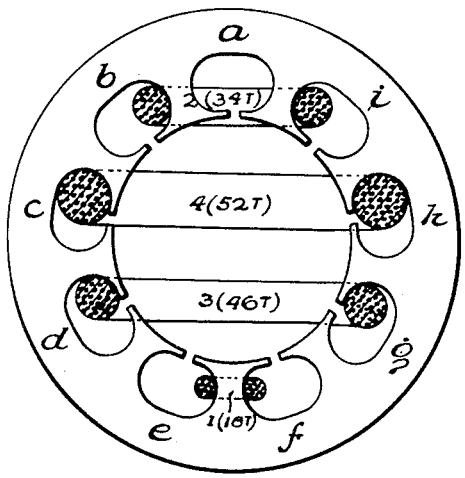
Figures 5 and 6 are diagrams for 9-slot stators with the distribution of windings made according to the invention to eliminate harmonics, in Figure 5 there is no reliance upon the Y-connection to eliminate the third harmonic while Figure 6 requires the Y-connection to eliminate the third harmonic.

These coils are correspondingly identified in Figure 5. In other words, two coils have been added to those in Figure 4 and an improved performance obtained, including freedom from any effect due to the characteristics of a round rotor having two symmetrical poles, the rotor now being preferably of the non-salient pole type.

Figure 6:
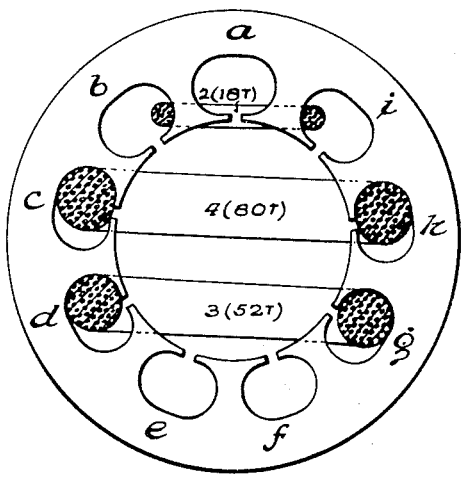

Also within the invention, I discovered that, as in Figure 6, a single coil could be added to the two of Figure 4 with the same improvement in the performance, the principal difference being that the winding is simpler while equally effective for a 3-phase Y-connected stator. The winding relation is as follows:

| Coil | Percent | Turns |
|---|---|---|
| $N_4$ | 53.2 | 80 |
| $N_3$ | 34.7 | 52 |
| $N_2$ | 12.1 | 18 |
|  | 100.0 | 150 |

In other words, there has been dropped from Figure 5 the coil $N_1$ which has the lowest coupling factor for the fundamental and is the most difficult to install.

The addition of any $N_2$ coil to the phase winding of a 9-slot stator provides an improvement in direct ratio as the correct value of turns for $N_2$ is approached.

A somewhat different embodiment is shown in the common application of Figure 7 in which the transmitter 30 sets up sine and cosine components in the normal phases 31 and 32. Receiver 33 has like normal phases 34 and 35. The rotors 36 and 37 respectively for transmitter and receiver are connected with the common A. C. supply 38 with the result that an angular movement of transmitter rotor 36 produces a like movement of receiver rotor 37 to a new equilibrium position as is well known.

Under the invention, one phase for the 9-slot stator is made as shown in Figure 5 while the normal phase is made as the ladder coil of Figure 8. Due to the average angularity of the coils, approximately 1.5% more turns are needed. It is apparent from Figure 8 that the 4 coils of Figure 5 are split into 8 coils as follows:

| Coils | Percent | Turns |
|---|---|---|
| $2N_4'$ | 34.73 | 54 |
| $2N_3'$ | 30.54 | 46 |
| $2N_2'$ | 22.67 | 34 |
| $2N_1'$ | 12.06 | 18 |
|  | 100.00 | 152 |

Both coils $N_4'$, for example may have 9 turns, coils $N_1'$, being coils c—d and g—h. This phase enjoys the same freedom from harmonics as that shown in Figure 5, to which it is normal. By selecting a different total number of turns, the integer-turns more closely approximate the correct percentages.

Referring to Figure 8, the coupling in one sense between the two phases in any given slot, e. g. slot e, is completely neutralized by identical coupling in the opposite sense in a complementary slot, that in slot f. To avoid confusion, only coil e—f of the other phase is shown (dotted) in Figure 8.

As earlier mentioned in connection with Figures 2–4, the 5th harmonic may be substantially eliminated by means of the right amount of taper for the width of face of a salient 2-pole rotor. Thus, referring to Figure 9, a taper of 0.005" is best for a rotor of 0.322" width and 0.495" diameter with 0.0025" air-gap minimum.

The graph on Figure 9 shows the voltage for the stator in percentage of that for the rotor for different positions of the rotor from the zero shown on its pilot diagram of the stator windings. Curve $A_3$, e. g., shows the relation with zero taper to be non-sinusoidal with a strong 5th harmonic while curve $B_3$ for the 0.005" taper rotor is a substantially pure sine, the curve for this coil which encloses 3 teeth in the shorter path being a fair average considering the coupling weights of the several coils. The other B curves contain substantial 3rd harmonics only, which, however, are neutralized by the Y-connection.

As earlier noted, this rotor is one means of carrying out the method of obtaining superior accuracy of telemetering by providing a substantially pure sinusoidal coupling between stator and rotor as the rotor's angular position changes. While deformed magnetic surfaces defining airgaps are well known in the motor and generator art, the use of precisely sine-matched taper and pole-width in self-synchronous telemeters solved a problem which was long faced by skilled workers in this art.

Figure 10 is a similar graph in which the 3-tooth coil's voltage ratio is compared with a pure sine curve for several different tapers and two rotor widths. This shows that the earlier-stated rotor taper gives optimum performance and that it narrows the effective width of the rotor. In other words, a narrower rotor would require less taper.

The consideration of such graphs as that on Figure 9 also led to the production of a substantially pure sine relation by the addition of coil 2 with an adjustment of the number of turns in the other coils, as shown in Figure 6. This added means brought the circulating currents in the 3 phases into phase as regards time, when the rotors at transmitter and receiver are in corresponding positions, by eliminating the 5th and 7th harmonics from the impedances.

This also provided a better null-voltage since the poor null with conventional windings is due to the differences of time-phase of these circulating currents.

For example, with conventional stator windings, when the transmitter rotor was at 30° from its zero reference, the receiver rotor was at 32° in equilibrium, thus causing 2° error at null. This 2° null error was caused by the stated odd harmonics. Under this condition, there existed 0.150 volt caused by the improper time-phasing of the circulating currents. This was objectionable because it kept the amplifier gain for the motor drive so low that the telemeter was not sufficiently sensitive to give optimum performance. By the means added under the invention, this null-voltage is reduced to less than one-tenth of the 0.150 volt value with a proportional increase in the possible gain and sensitivity and a proportional decrease in the error.

Once the foregoing approach is understood, one can modify the distribution of the turns in the several coils and experimentally determine the closeness with which the truly sinusoidal relation is approached, making successive modifications under the invention until the required accuracy is attained.

But while the foregoing procedure enables one to practice the invention, I have provided the following novel and more direct method of procedure, one which usefully eliminates successive cut-and-try approximations.

Consider the voltage generated by, and the impedance of, a single bar in one stator slot of the 9-slot stator, e. g., of Figure 11, as the angular position of an undefined A. C. excited rotor is varied. In Figure 12, the heavy curve shows the coupling of the bar to the rotor in volts per bar for 1 volt per turn in the rotor. Since the bar constitutes half of a turn, the maximum coupling factor thus expressed is approximately one-half. The light curves show the fundamental and the strong 3rd harmonic components.

This can be put into Fourier series form.

$$E = E_1 \sin\phi + E_{1'} \cos\phi + E_2 \sin 2\phi + E_{2'} \cos 2\phi \ldots \quad (2)$$

and $$Z = Z_0 + Z_1 \sin\phi + Z_{1'} \cos\phi + Z_2 \sin 2\phi + Z_{2'} \cos 2\phi + \ldots \quad (3)$$

Call the axis of the rotor shaft the $z$ axis, and the axis of the N and S poles the $x$ axis. Then, if the rotor is symmetrical about both the $x$ and $y$ axes, the even harmonics and cosine terms drop out and all terms reach a maximum algebraic value at 90°.

$$E = E_1 \sin\phi + E_3 \sin 3\phi + E_5 \sin 5\phi + \ldots \quad (4)$$

$$Z = Z_0 + Z_1 \sin\phi + Z_3 \sin 3\phi + Z_5 \sin 5\phi + \ldots \quad (5)$$

Figure 5 shows the four possible independent parallel coils of a 9-slot stator. Referring to Figure 13, the reference axis is chosen $90°/n$ from slot $a$ in order to bring the axis parallel to the coils, wherein $n$ is the number of stator slots.

As shown in Figure 14, this shifts the fundamental coupling curve of the bars in slot $a$ 10° and the fundamental coupling curve of the bars in slot $e$ by 170° so that the coupling of coil $(n-1)/2$, where $(n-1)/2$ is the slot pitch, is $$N_{(n-1)/2} E_1 \sin\left(\phi + \frac{90°}{n}\right) -$$

$$N_{(n-1)/2} E_1 \sin\left[\phi + \left(180° - \frac{90°}{n}\right)\right]$$

$$2E_1 \sin\phi \left[N_{(n-1)/2} \cos\frac{90°}{n}\right] \quad (6)$$

where N is the number of turns and the subscript is the slot pitch. For the 9-slot stator this factor is $2E_1 \sin\phi N_4 \cos 10°$. This fundamental coupling factor is shown in Figure 14 and in the vector form of Figure 15.

Likewise the fundamental coupling factor in coil $$\frac{(n-3)}{2} \text{ is } 2E_1 \sin\phi N_{(n-3)/2} \cos\frac{90°}{n}$$

as shown in Equation 7.

$$E_1 = 2E_1 \sin\phi \left[ N_{(n-1)/2} \cos\frac{90°}{n} + N_{(n-3)/2} \cos\frac{90°}{n} + N_{(n-5)/2} \cos\frac{90°}{n} + \cdots N_1 \cos(n-2)\frac{90°}{n} \right] \quad (7)$$

which for the 9-slot stator, reduces to $$E_1 = 2E_1 \sin\phi (N_4 \cos 10° + N_3 \cos 30° + N_2 \cos 50° + N_1 \cos 70°) \quad (8)$$

Similarly for any harmonic $h$ in the coupling curve of Figure 12, the phase of the curve is shifted $h \cdot 90°/n$ for the bars in slot $a$. Thus the 3rd harmonic of bars in slot $a$ of 9-slot stator shown in Figure 13 is at 3 times 10° or 30° from the zero of the 3rd harmonic curve. The 3rd harmonics of bars in slots $a$ and $e$ are added vectorially as shown in Figure 16 so that the third harmonic in coil 4 of the 9-slot stator is $$E_1 = 2E_3 \sin 3\phi (N_4 \cos 30°) \quad (9)$$

This may be stated generally for all harmonics as follows:

$$E_h = 2E_h \sin h\phi \left[ N_{(n-1)/2} \cos h\frac{90°}{n} + N_{(n-3)/2} \cos 3h\frac{90°}{n} + \cdots + N_1 \cos h(n-2)\frac{90°}{n} \right] \quad (10)$$

From the above it is readily seen that any given harmonic may be suppressed in at least two different ways: either $E_h \sin h\phi$ may be made zero by modifying the rotor flux distribution or the term inside the bracket may be made zero by proper distribution of the turns in the stator slots in accordance with Equation 10.

It should be noted that the stator and rotor members may be interchanged or inverted so that a cylindrical rotor having an odd number of slots with a single (or multiple) phase sine winding distributed as outlined above works with a stator having an even number of slots and very simple symmetrical windings. Such windings would be very advantageous when a large number of stator phases is desired.

In Figure 17, the rotor, instead of the stator, is wound non-harmonically under the invention while the stator, instead of the rotor, is symmetrical. For this example a single phase winding is placed upon a 7-slot rotor using three parallel coils, or equivalents, and two normal-phase windings are placed on a 12-slot stator using two parallel coils per phase preferably each of 5-slot pitch.

This construction of Figure 17 has the advantage that the rotor need not be so nearly symmetrical, a feature of practical importance for such applications as gyro-gimbal take-off transmitter units. This illustrates the invertability of the rotor and stator.

Figure 18 relies on the shape of the rotor to provide a rotor-flux distribution which eliminates the 5th and 7th harmonics. The rotor and stator have 40° relative skew for the effectively 9-slot stator, 6 dummy slots complementing 3 coil-containing slots with the coils Y-connected to eliminate the 3rd harmonic. This construction permits the unit to be of minimum size under the invention to provide the substantially true sine relation which makes accurate telemetering possible with devices of the self-synchronous servo type disclosed, the rotor faces being sine-tapered.

In the use of the modified Fourier procedure, a certain symmetry appears in eliminating harmonics above and below the $n$th harmonic where $n$ is still the number of stator slots.

Consider the $n$th harmonic:

$$\cos h 90°/n = \cos n 90°/n = \cos 90° = 0 \quad (11)$$

Then for harmonic $h' = n+2$ $$\cos h' 90°/n = \cos (n+2) 90°/n = \cos (90° + 180°/n) \quad (12)$$

and for harmonic $h'' = n-2$ $$\cos h'' 90°/n = \cos (n-2) 90°/n = \cos (90° - 180°/n) \quad (13)$$

It will be seen from Equations 12 and 13 that these terms are symmetrical about the $n$th harmonic since $$\cos (90° + 180°/n) = -\cos (90° - 180°/n) \quad (14)$$

In this fashion if the $E_h''$ for any particular value of $h$ less than $n$ is made zero by distributing the winding to make the bracketed-term zero, then the summation value $E_{h'}$ for an equal order above $n$ is also zero.

For example, with a 9-slot stator, where $E_7$ is made equal to zero, then $E_{11}$ is likewise zero since $$E_7 = 2E_7 \sin 7\phi (N_4 \cos 70° + N_3 \cos 210° + N_2 \cos 350° + N_1 \cos 490°) = 0 \quad (15)$$

and $$E_{11} = 2E_{11} \sin 11\phi (N_4 \cos 110° + N_3 \cos 330° + N_2 \cos 550° + N_1 \cos 770°) = 0 \quad (16)$$

Noting that $$\cos 70° = -\cos 110°$$
$$\cos 210° = -\cos 330°$$
$$\cos 350° = -\cos 550° = -\cos 190°$$
$$\cos 490° = -\cos 130° = -\cos 770° = -\cos 50°$$

In other words, the terms $N_4$, $N_3$, $N_2$, $N_1$ are identical in the two equations and the cos terms have identical numerical values but are of opposite signs. It may be incidentally noted that the $N_3$ term in Equations 15 and 16 is opposite in sign from the other terms.

In regard to the fundamental coupling factor of ladder-type windings, the coupling of, e. g., the 4 slot pitch coil in a 9-slot stator is $(1+\cos 20°)$ instead of $(2 \cos 10°)$ as explained for a parallel-coil winding, or $$K = \frac{2 \cos 10°}{1 + \cos 20°} = \frac{2 \times .9848}{1 + .9397} = \frac{1.9696}{1.9397} = 1.015$$

In other words, the ladder-coil winding requires 1.5% more turns than its matching parallel-coil winding. While this effect is small, its consideration helps one to perfect the winding distribution.

While generally less desirable, a stator and a rotor both having an even number of slots can be used under the invention by an extension of the foregoing procedure which is considerably extended because it requires consideration of non-parallel coils and hence of both sine and cosine terms of $E_h$. It is not given here because, since this extension involves no new principles, it may be carried out by one skilled in this art after understanding the foregoing explanations. Likewise other generally undesirable ladder-type windings may be made for particular cases under the invention in stators having an odd number of slots.

From the foregoing it is manifest that the invention may be embodied in numerous and diverse forms. For one example, it may be advantageously used with large alternators in which efficiency is raised by the production of a substantially pure sine wave with respect to time. For another it may be simply used with electrical elements which are relatively displaced in translation instead of rotation, e. g. pickups for operating working signals to moving trains. For still another it permits the more accurate modulation of a square-wave input voltage. It also has completely cured a long-standing difficulty with self-synchronous inductive servo systems due to the previously present positional errors and points of high null-voltages spaced at 60° intervals.

When a distribution of bars is worked out which causes all coefficients above the first to cancel, the output of the stator will vary accurately as the sine and the impedance will consist of a constant plus a sine variation which will be zero if the receiver is a skewed cylinder with no electrical load. This will be true regardless of the rotor's shape and flux distribution provided there are no abrupt changes producing appreciable harmonics higher than those neutralized. For all practical rotors this condition is completely met. Only if the rotor is unskewed and subtends an extremely small arc, i. e., flux concentrated angle of less than 30°, will the condition not be met. The only remaining deviations are due to mechanical errors which affect the symmetry and it is now possible in all practical cases to make the theoretical errors vanish into the mechanically produced "background errors."

If desired, a rotor, which has an odd number of slots wound to conform to the distribution for harmonic elimination, may be used to produce true sine voltages in a stator which has an even number of slots with very simple stator windings of any distribution provided only that these windings are symmetrical about both axes normal to the shaft.

For example, a 7-slot single phase excited rotor, wound to eliminate the 3rd, 5th, 9th and 11th harmonics and working in either a 6-slot 3-phase stator or a 12-slot stator having 1, 2, 3, 4, 6 or 12 phases, gives excellent sine wave output voltages in all phases. This combination also works out simply and advantageously for a 2-phase telemetric system or for resolving angles into sine and cosine components.

For some purposes, e. g., in a differential-type synchro, the invention may be practiced by using a rotor having a 3-phase Y-connected winding which is symmetrical, in the plane of rotation, to two axes normal both to each other and to the axis of rotation (e. g., like the stator winding of Fig. 17) in a stator having a 3-phase Y-connected stator winding with coils whose turns vary directly with the slot pitch (e. g., as in Figures 1, 5 and 6). Or the rotor and stator may be inverted.

In the claims, "stator" and "rotor" have been used to avoid ambiguity, these may accordingly be interchanged without affecting their relative functioning.

If some other wave shape than the sinusoidal is required, it may be provided by using my method. Also the fundamental may be suppressed and a high harmonic be produced by a low-speed generator under my invention.

Where a pair of poles is referred to in the claims, this may be one of a number of by-poles within the invention.

The breadth of the invention, which appears above, is to be considered in reading the appended claims.

In the claims, a "synchro unit" or "self-synchronous inductive unit" refers to either a transmitter or receiver unit of the sort disclosed in U. S. Patent 2,038,059 to Reichel et al., while "self-synchronous inductive servo system" has such a unit at the receiver servo-driven as in U. S. Patent 2,240,680 to Stuart and in general also has such a unit at the transmitter. However, the invention may be practiced with such a unit as one of the two telemetric units with the other unit of another sort than that shown in U. S. Patent 2,038,059.

Although only a few embodiments of the invention have been illustrated and described, various changes and modifications in the form and relative arrangement of the parts, which will now appear to those skilled in the art, may be made without departing from the spirit or the scope of the invention. Reference is therefore to be had to the appended claims for a definition of the limits of the invention.

What I claim is:

1. A synchro unit comprising a stator having 3-phase Y-connected windings in 3 coil-slots, whereby harmonics 3 and 9 are neutralized, and also having 6 dummy slots, and a single-phase bisymmetrical rotor having 2 salient poles with the pole faces of effectively 80° substantially in width and shaped to minimize the 5th and 7th harmonics, the rotor and stator having effectively 40° substantially relative skewing, whereby a closely sinusoidal relation is provided between the coupling and the relative angle between rotor and stator.

2. A synchro unit comprising two inductive elements: a stator and rotor angularly movable with respect to said stator, said stator having 3-phase Y-connected windings, whereby the 3rd and 9th harmonics are neutralized, and 9 effective equally spaced slots consisting of 3 coil-slots for said winding and 6 dummy slots, and said rotor being single-phase and bisymmetrical and having 2 salient poles with the pole faces of effectively 80° substantially in width and shaped to have a closely arcuate peripheral profile normal to the axis of rotation with a radial feather at a width of 80° equal to substantially twice the minimum radial clearance to minimize the 5th and 7th harmonics, the unit being constructed to have substantially 40° relative skewing between said elements, whereby a closely sinusoidal relation is provided between the coupling and the relative angle between rotor and stator.

3. The synchro unit set forth in claim 2, in which there is a departure from the stated width of pole face, and the profile is changed to have a corresponding change of the radial feather, in the same direction.

4. An inductive unit comprising two inductive elements of high permeability, constructed and arranged to be relatively movable without changing their distance apart, one of said elements having 3-phase Y-connected windings in 3 coil-slots per cycle of a selected number of $a3$ equally spaced slots per cycle with $3(a-1)$ dummy slots per cycle, whereby the 3rd and 9th harmonics are neutralized, and the other of said elements is constructed to have $b2$ salient poles with the pole faces effectively of substantially $cL/a3$ in width, i. e. in the direction of the stated movement, where $L$ is the distance in the direction of movement for a complete cycle and $a$, $b$, and $c$ are small integers, each pole face being shaped to be symmetrical about its axis and with its profile normal to the direction of the stated relative movement substantially arcuate to provide an increase of clearance of substantially twice the minimum value of said distance at a point $L/9$ from said axis of symmetry in the direction of the stated relative movement, whereby the 5th and 7th harmonics are minimized, the two elements being constructed to have $L/3a$ effective skewing, whereby a closely sinusoidal relation is provided between the coupling and the stated relative movement.

5. An inductive unit as set forth in claim 4 in which $a$ is odd.

6. An inductive unit comprising two relatively movable elements of high permeability, constructed and arranged to be relatively movable without changing their distance apart, one of said elements having 3-phase Y-connected windings in 3 coil-slots per cycle, whereby the 3rd and 9th harmonics are neutralized and also having $3e$ dummy slots per cycle, where $e$ is a small integer, with the effective slots substantially equally spaced, the other of said elements is constructed to have $b2$ salient poles with the pole faces effectively of substantially $cL/3(1+e)$ in width, i. e. in the direction of the stated movement, where L is the distance in the direction of the stated movement for a complete cycle and $b$ and $c$ are small integers, and each pole face is shaped to be symmetrical about its axis and with its profile, normal to the direction of the stated relative movement, substantially arcuate to provide an increase of clearance of substantially twice the minimum value of said distance at a point $L/9$ from said axis of symmetry in the direction of the stated relative movement, whereby the 5th and 7th harmonics are minimized, and the two elements are constructed to have $L/3(1+e)$ effective skewing, whereby a closely sinusoidal relation is provided between the coupling and the stated relative movement.

7. A synchro unit comprising a stator having 3-phase Y-connected windings in 3 coil-slots and also having $3e$ dummy slots, where $e$ is a small integer, whereby the 3rd and 9th harmonics are neutralized, and a single-phase bisymmetrical rotor, whereby all even harmonics are neutralized, having $b2$ salient poles with the pole faces of effectively $c120°/(1+e)$ substantially in width, where $b$ and $c$ are small integers, and shaped to have a closely arcuate peripheral profile normal to the direction of the axis of rotation with a radial feather at a point 40° from the axis of bisymmetry equal to substantially twice the minimum radial clearance to minimize the 5th and 7th harmonics, the rotor and stator being constructed to have substantially $120°/(1+e)$ effective relative skewing, whereby a closely sinusoidal relation is provided between the coupling and the relative angle between rotor and stator.

8. The synchro unit set forth in claim 7, in which there is a departure from the stated width of pole face and the profile is changed to have a corresponding change of radial feather in the same direction.

9. A synchro unit comprising two inductive elements: a stator and a rotor angularly movable with respect to said stator, said stator having 3-phase Y-connected windings, whereby the 3rd and 9th harmonics are neutralized, in 3 coil-slots and also having $3e$ dummy slots to constitute $3(1+e)$ effective slots, where $e$ is a small integer, and a bisymmetrical rotor, whereby all of the even harmonics are neutralized, constructed to minimize the other low-order odd harmonics.

10. The synchro unit set forth in claim 9, in which the unit is constructed to have one effective slot-pitch relative skewing between said elements.

11. A synchro unit comprising two relatively movable elements of high permeability which are constructed and arranged to be relatively movable without changing their distance apart, one of said elements having 3-phase Y-connected windings, whereby the 3rd and 9th harmonics are neutralized, in 3 coil-slots and is constructed to have $3e$ dummy slots per cycle to constitute $3(1+e)$ effective slots, where $e$ is a small integer, and the other of said elements is constructed to be bisymmetrical, whereby all of the even harmonics are neutralized, and is modified to minimize the other low-order harmonics, whereby a closely sinusoidal relation is provided between the coupling and the stated relative movement between said elements.

12. A synchro unit as set forth in claim 11, in which the unit is constructed to have one effective slot-pitch relative skewing between the two elements.

13. A synchro unit having two elements of high permeability, constructed and arranged to be angularly relatively movable and to have one effective slot-pitch relative skewing, one element being constructed to be bisymmetrical and the other to be symmetrical about an axis normal to that of rotation, and either element being shaped to minimize at least two odd, low-order harmonics and the other element being constructed to include dummy slots with all effective slots equally spaced, whereby the order of the harmonic introduced by the coil-containing slots is raised with a consequent proportional reduction of the magnitude of both said harmonic and the stated relative skewing.

JOHN P. GLASS, Jr.

No references cited.